No. 783,196. Patented February 21, 1905.

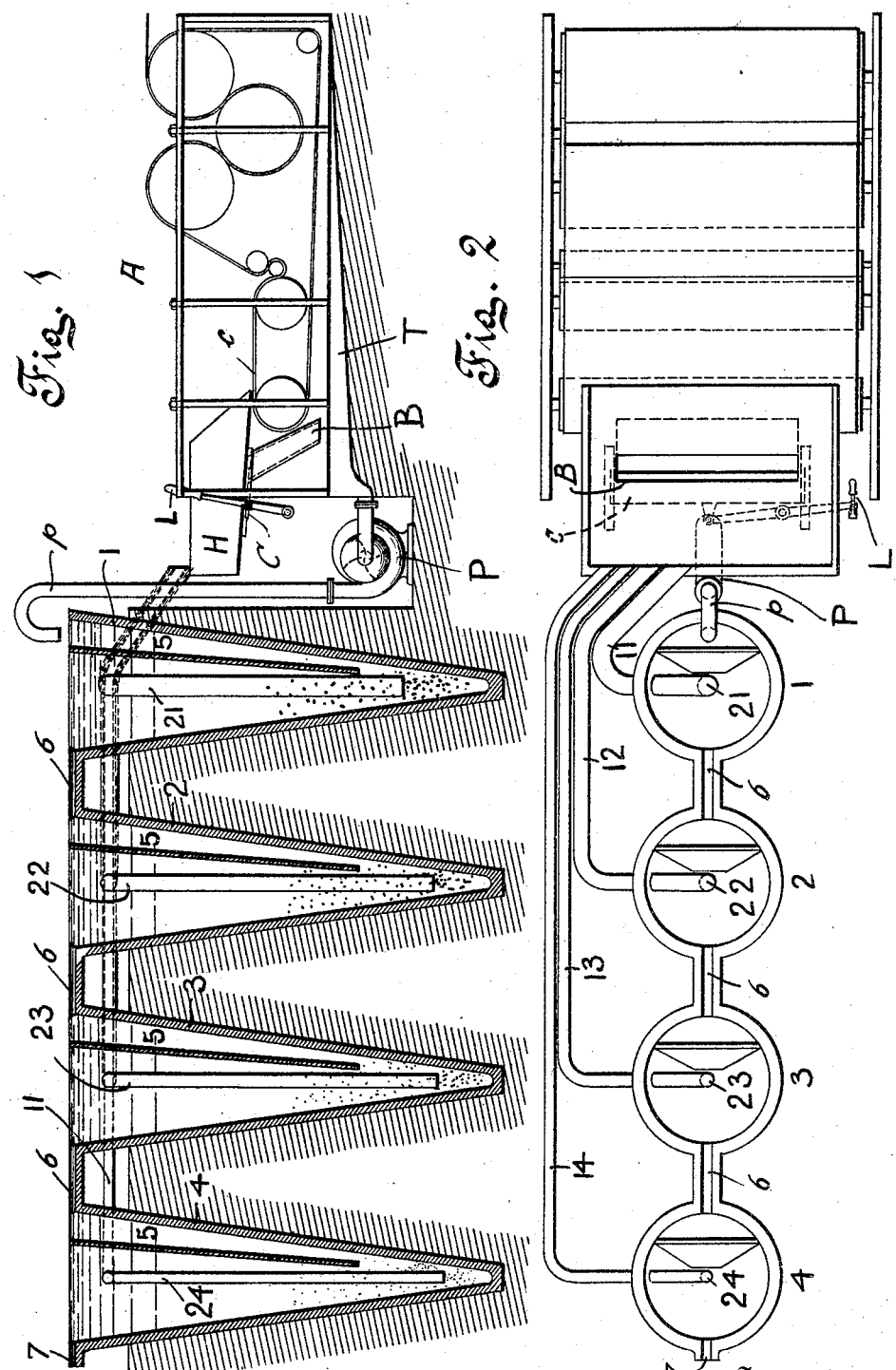

UNITED STATES PATENT OFFICE.

LUDWIG HATSCHEK, OF VOCKLABRUCK, AUSTRIA-HUNGARY.

SEPARATOR FOR SEPARATING WATER FROM CEMENT, &c.

SPECIFICATION forming part of Letters Patent No. 783,196, dated February 21, 1905.

Application filed September 13, 1904. Serial No. 224,297.

*To all whom it may concern:*

Be it known that I, LUDWIG HATSCHEK, a subject of the Emperor of Austria-Hungary, residing in Vocklabruck, Austria-Hungary, have invented certain new and useful Improvements in Separators for Separating Water from Cement, &c., of which the following is a specification.

The object of my invention is to effect a saving in the cost of manufacturing plates of cement and fibrous materials, such as disclosed in my United States Patent No. 769,078, dated August 30, 1904, and this object I attain by conducting away from the plate-making machine the heretofore waste liquid and separating out from it such quantities of water as to leave a liquid containing sufficient cement and fibers to be returned to the machine and again used in making plates. Not only does this result in the saving before referred to, but the quality of the plates is also improved, as the finest and the best cement was before washed away, whereas now I trap it and carry it back to the machine to be used in making the plates.

In the accompanying drawings, Figure 1 shows diagrammatically in section my plate-making machine and separating-tanks, and Fig. 2 is a plan of Fig. 1.

As shown in Fig. 1 in diagram, A is the paper-making type of plate-making machine, and H is the hopper by which the liquid mixture of hydraulic cement and fibrous materials is supplied to the machine. T is a trough extending beneath the entire length of the machine, so as to catch all the waste liquid filtering through the wire-cloth $c$. Heretofore I have used for this purpose cloth of the finest mesh; but by the use of the separators hereinafter described I am enabled to use much coarser mesh, losing more cement and fibers through the cloth as a consequence, but greatly increasing the speed, and hence the production, of the machine. As I save this apparent loss in my separators, it will be seen that it is in reality no loss at all, but results in a gain in output due to the more rapid formation made possible by the rapidity with which the water may flow through the wire-cloth and away from the machine. These separators I have shown in my preferred form as cone-shaped tanks 1, 2, 3, and 4, set in the ground for convenience of support, with their apices down. Each tank has in its side a passage 5, formed by a plate fitted therein, and this passage is open at its top and bottom. The top of tank 1 is connected by an overflow-channel 6 with the passage 5 of the tank 2, which construction is followed out to the last of the series of tanks, where the overflow 7 leads to waste. Upright pipes 21, 22, 23, and 24 are placed in the tanks 1, 2, 3, and 4, open at their lower ends and connected at their other ends with troughs 11, 12, 13, and 14, respectively, which troughs may lead directly to the hopper of the machine. A pump P is used to circulate the material from the trough T by the pipe $p$ to the tank 1. The pipes 21 and 24 may conveniently be of different diameters gradually decreasing from the pipe 21 of largest diameter.

The hopper H is provided with a by-pass B to the trough T, which is controlled by a lever L and slide C, to enable the operator to readily change the feed to maintain the supply to the machine regular. The feed to the hopper being by gravity from a definite and unchangeable height materially assists in securing an even feed.

In operation the muddy water is led to the passage 5 of tank 1. It enters the bottom thereof, where the restricted cross-section of the tank gives the water a rapid circulation, preventing the cement from "setting." The speed of circulation becomes slower as the liquid rises, due to the greater cross-section of the tank, and this gives the heavier fibers and cement particles an opportunity to drop and collect around the open-ended pipe 21, the liquid in which has a rate of circulation substantially equal to that of the restricted lower end of the cone, which circulation may be increased either by pumping or, as I have shown it in my drawings, by locating the outlet of the pipes at a lower level than the overflow at the top of the tanks. The draw-off of this pipe is passed back to the machine by way of the hopper H. The overflow at 6 of tank 1 carries over some of the lighter particles of cement and fibers to tank 2. It is subjected to the same treatment in tank 1, and so on through the series until it leaves tank 4 at outlet 7 as clear water, substantially all the cement and fibers having been saved. The almost vertical walls of the tanks are essential so that no cement can lodge to set, and thereby block the separators, and all the channels, troughs, and piping must be designed to enable access.

I claim as my invention—

1. In combination with a machine of the paper-making type for making plates of hydraulic cement and fibrous materials, apparatus for separating water from cement and fibrous materials, comprising a tank having a contracted bottom, an inlet to said bottom for the materials to be separated, a pipe open adjacent to the bottom and leaving said tank at a distance below its water-overflow line, and means for collecting the outflow from said pipe.

2. Apparatus for separating water from cement and fibrous materials, comprising a series of tanks, an inlet to the bottom of one tank for the material to be treated, a collecting-tank, a pipe extending from near the bottom of said tank, leaving said tank so as to enter the collecting-tank at a lower level than the water-overflow of said tank, means to collect the overflow and admit it to the bottom of the next tank of the series, which is similarly constructed and provided with a pipe to the collecting-tank, and so on, through the series of tanks, the diameter of said pipes decreasing as the tanks are farther away from the first said tank, in combination with a machine of the paper-making type for the manufacture of plates from hydraulic cement and water, a supply-inlet to said machine connected to the open-ended pipes, and an overflow-outlet for the waste, and a connection from said outlet to the aforesaid passage.

3. Apparatus for separating water from cement and fibrous materials, comprising a series of tanks, an inlet to the bottom of one tank for the material to be treated, a collecting-tank, a pipe extending from near the bottom of said tank, leaving said tank so as to enter the collecting-tank at a lower level than the water-overflow of said tank, means to collect the overflow and admit it to the bottom of the next tank of the series, which is similarly constructed and provided with a pipe to the collecting-tank, and so on, through the series of tanks, in combination with a machine of the paper-making type for making plates of hydraulic cement and fibrous materials, a trough to said machine to collect the waste liquid therefrom, and means to deliver it to said first tank of the series, and means to redeliver the liquid material drawn off by the pipes to the machine.

In testimony whereof I have signed my name to this specification in the presence of two subscribing witnesses.

LUDWIG HATSCHEK.

Witnesses:
HENRY CADMUS,
F. WARREN WRIGHT.